(12) United States Patent
Trachtman

(10) Patent No.: US 10,929,040 B1
(45) Date of Patent: Feb. 23, 2021

(54) RAID 1—HALF COMPRESSED DATA STORAGE

(75) Inventor: Michael Trachtman, Arlington, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1529 days.

(21) Appl. No.: 13/247,173

(22) Filed: Sep. 28, 2011

(51) Int. Cl.
| | |
|---|---|
| G06F 12/16 | (2006.01) |
| G06F 3/06 | (2006.01) |
| G06F 12/08 | (2016.01) |
| G06F 11/14 | (2006.01) |

(52) U.S. Cl.
CPC .............. G06F 3/064 (2013.01); G06F 3/065 (2013.01); G06F 11/1458 (2013.01); G06F 11/1461 (2013.01); G06F 12/08 (2013.01); G06F 2212/401 (2013.01)

(58) Field of Classification Search
CPC .... G06F 3/064; G06F 3/065; G06F 2212/401; G06F 12/08; G06F 11/1458; G06F 11/1461
USPC .......................................................... 711/162
See application file for complete search history.

(56) References Cited

U.S. PATENT DOCUMENTS

| | | | | |
|---|---|---|---|---|
| 5,694,619 A | * | 12/1997 | Konno ............................ | 710/68 |
| 5,720,025 A | * | 2/1998 | Wilkes et al. ............... | 714/6.12 |
| 6,442,659 B1 | * | 8/2002 | Blumenau .......... | G06F 11/1076 711/114 |
| 6,879,266 B1 | * | 4/2005 | Dye et al. ........................ | 341/51 |
| 7,103,740 B1 | * | 9/2006 | Colgrove et al. ............. | 711/162 |
| 7,424,592 B1 | * | 9/2008 | Karr ....................... | G06F 3/0605 711/203 |
| 7,434,091 B1 | * | 10/2008 | Karr ....................... | G06F 3/0614 711/114 |
| 7,500,070 B2 | * | 3/2009 | Schilling et al. ............. | 711/162 |
| 7,512,862 B1 | * | 3/2009 | Taylor ................. | G06F 11/1076 702/189 |
| 7,631,151 B2 | * | 12/2009 | Prahlad et al. ................ | 711/147 |
| 2003/0041211 A1 | * | 2/2003 | Merkey ............... | G06F 11/1076 711/114 |

(Continued)

OTHER PUBLICATIONS

K. Gopinath, Nitin Muppalaneni, N. Suresh Kumar, and Pankaj Risbood. 2000. A 3-tier RAID storage system with RAID1, RAID5 and compressed RAID5 for Linux. In Proceedings of the annual conference on USENIX Annual Technical Conference (ATEC '00). USENIX Association, Berkeley, CA, USA, 30-30.*

(Continued)

*Primary Examiner* — Ramon A. Mercado
(74) *Attorney, Agent, or Firm* — Anderson Gorecki LLP

(57) ABSTRACT

In a half-compressed RAID 1 system a first copy of a data set is maintained in an uncompressed state and a second copy of the data set is maintained in a compressed state, where corresponding compressed and uncompressed blocks are stored on different physical devices. The result is RAID 1 reliability with storage space consumption similar to RAID 5-3+1. Compression striping in which the compressed and uncompressed data is distributed across two or more storage devices can be used to reduce data access response time. Further, delayed compression can be used to reduce the time required to perform WRITE ops. Compression may also be performed based on resource availability or storage tier hierarchy.

37 Claims, 8 Drawing Sheets

(56) References Cited

U.S. PATENT DOCUMENTS

| | | | |
|---|---|---|---|
| 2005/0076263 A1* | 4/2005 | Tomita | G06F 11/2058 714/6.23 |
| 2005/0108484 A1* | 5/2005 | Park | 711/162 |
| 2005/0168934 A1* | 8/2005 | Wendel | G11B 33/08 361/679.36 |
| 2006/0101130 A1* | 5/2006 | Adams | H04L 29/12009 709/218 |
| 2007/0136541 A1* | 6/2007 | Herz | G06F 11/1466 711/162 |
| 2008/0022058 A1* | 1/2008 | Nadathur et al. | 711/162 |
| 2010/0077168 A1* | 3/2010 | Arakawa | G06F 12/0223 711/165 |
| 2010/0115198 A1* | 5/2010 | Jess | G06F 3/0611 711/114 |
| 2011/0239041 A1* | 9/2011 | S et al. | 714/6.1 |
| 2012/0131293 A1* | 5/2012 | Benhase et al. | 711/162 |

OTHER PUBLICATIONS

Paul Massiglia; "The RAID book: A Storage System Technology Handbook"; 1997; pp. 139-140.*

K. Gopinath, Nitin Muppalaneni, N. Suresh Kumar, and Pankaj Risbood. 2000. A 3-tier RAID storage system with RAID1, RAID5 and compressed RAID5 for Linux. In Proceedings of the annual conference on USENIX Annual Technical Conference (ATEC '00). USENIX Association, Berkeley, CA, USA, 30-30. (Year: 2000).*

David A. Patterson, Garth Gibson, and Randy H. Katz. A case for redundant arrays of inexpensive disks (RAID). In Proceedings of the 1988 ACM SIGMOD international conference on Management of data (SIGMOD '88), Haran Boral and Per-Ake Larson (Eds.). (Year: 1988).*

* cited by examiner

RAID 1—HALF COMPRESSED DATA STORAGE

CROSS-REFERENCE TO RELATED APPLICATIONS

N/A

FIELD OF THE INVENTION

This invention is generally related to data storage, and more particularly to replicated data storage systems.

BACKGROUND OF THE INVENTION

Networked computing resources are widely used and relied upon by enterprises. Referring to FIG. 1, a user device 100 or a server 102 may access and utilize data maintained on a storage platform 104 via communications networks 106, 108. The storage platform includes features to maintain and protect the data because it may be critical to the operation of the enterprise. However, it should be noted that such features are not limited to use by networked storage platforms. One feature that is used to protect data is redundant arrays of independent disk (RAID) storage. Various levels of RAID storage are known in the art, but in general RAID systems are designed to enable recovery from data corruption on, or failure of, a physical storage device such as a disk. A level 1 RAID system, for example, maintains copies of a set of data on two or more physical storage devices such as a mirrored pair of disks 110. Consequently, if one of the disks fails the data is still available from the other disk. While such a system is highly reliable, it will be appreciated that it can require considerable storage capacity. Features such as parity data are used in some other RAID levels in order to achieve reduced storage capacity requirements. Features such as byte or block level striping are used in some other RAID levels in order to achieve enhanced response time. RAID 5, for example, uses block level striping with parity data distributed across all devices. Generally, there are tradeoffs between reliability, capacity requirements, and response time.

SUMMARY OF THE INVENTION

In accordance with an aspect of the invention, an apparatus comprises: first and second physical data storage devices upon which are stored first and second copies of a data set, wherein the first copy of the data set is maintained in an uncompressed state and the second copy of the data set is maintained in a compressed state, and wherein a first member of the data set is stored uncompressed on the first data storage device and stored compressed on the second data storage device.

In accordance with another aspect of the invention, a method comprises: storing first and second copies of a data set, including maintaining the first copy of the data set in an uncompressed state and maintaining the second copy of the data set in a compressed state, and storing a first member of the data set uncompressed on a first data storage device and storing the first member of the data set compressed on a second data storage device.

In accordance with another aspect of the invention, a computer program stored on a non-transitory computer readable medium comprises: logic which stores first and second copies of a data set, including logic which maintains the first copy of the data set in an uncompressed state and maintains the second copy of the data set in a compressed state, and logic which stores a first member of the data set uncompressed on a first data storage device and stores the first member of the data set compressed on a second data storage device.

An advantage associated with at least one embodiment of the invention is RAID 1 reliability with reduced storage capacity requirements because the compressed copy requires less storage capacity, e.g., 1/2 nB where the uncompressed copy is nB and the data compresses at 50%. More particularly, storage space consumption is similar to RAID 5-3+1. Furthermore, the existence of the uncompressed copy obviates the need for decompressing data for every READ operation. Compression striping in which the compressed and uncompressed data is distributed across two or more logical volumes or storage devices can be used to reduce data access response time. Further, delayed compression can be used to reduce the time required to perform WRITE ops. Compression may also be performed based on resource availability or storage tier hierarchy. These and other advantages of the invention will be more apparent from the detailed description and the drawing.

DETAILED DESCRIPTION

Various aspects of the invention may be implemented partially or completely in software using computer program code. The computer program code is stored on non-transitory computer-readable memory and utilized by processing hardware to implement instructions corresponding to certain steps. The program code may be provided as a computer program product or be integrated into network storage equipment.

Figure 1:
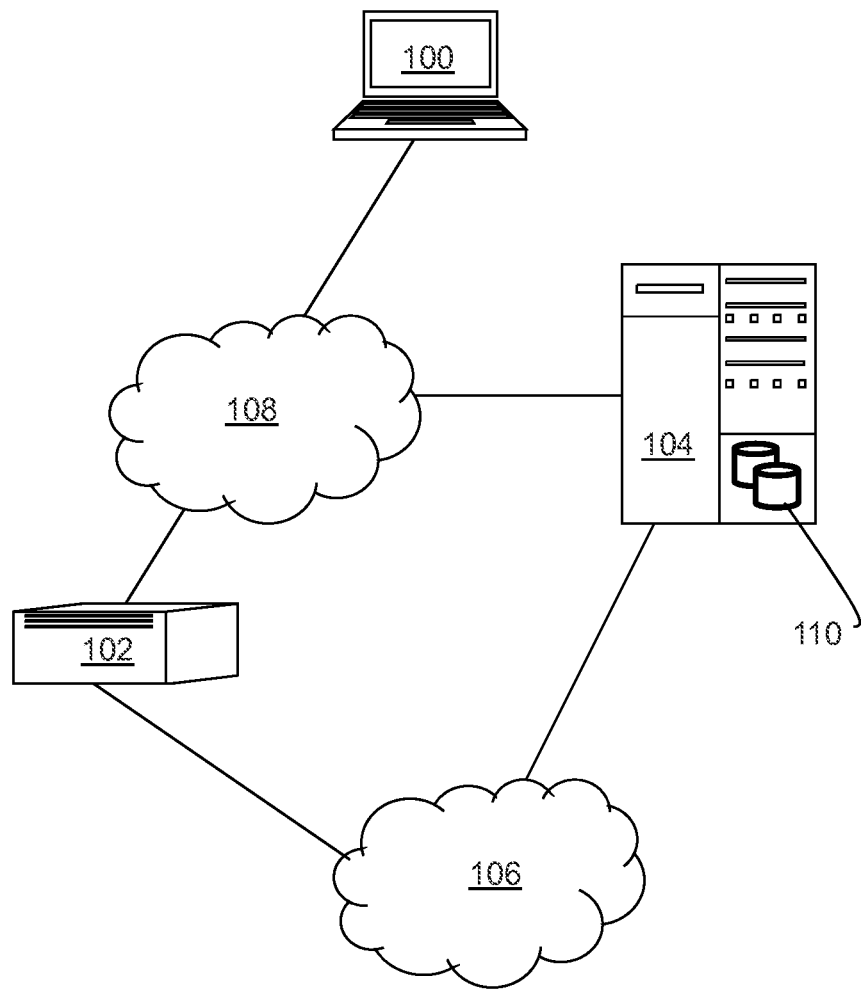
FIG. 1 illustrates a networked storage environment.
Figure 2:
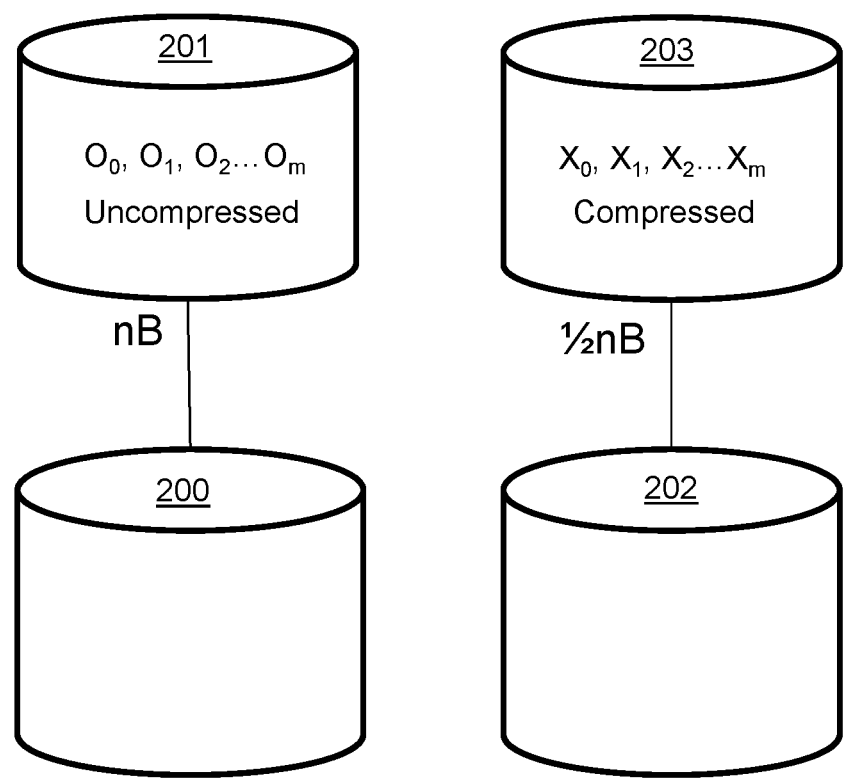
FIG. 2 illustrates a half-compressed RAID 1.

Referring to FIG. 2, in a half-compressed RAID 1 system a first copy of a data set, $O_0, O_1, O_2 \ldots O_m$, is maintained in an uncompressed state and a second copy of the data set, $X_0, X_1, X_2 \ldots X_m$, is maintained in a compressed state. The first copy is maintained on a first logical volume 201 associated with one or more physical storage devices 200 and the second copy is maintained on a second logical volume 203 associated with one or more different physical storage devices 202. The system is characterized by RAID 1 reliability because the different copies are on different physical storage devices. However, storage capacity requirements are reduced relative to prior art RAID 1 systems because the compressed copy requires less storage capacity, e.g., 1/2 nB where the uncompressed copy is nB and the data compresses at 50%. More particularly, storage space consumption is similar to RAID 5-3+1. Furthermore, the existence of the uncompressed copy obviates the need for decompressing data for every READ operation. In other words, READs may be performed using the uncompressed copies. When a WRITE is performed one uncompressed copy is stored and one compressed copy is stored. This will typically be more efficient than RAID-5 since RAID-5 typically requires a READ-MODIFY-WRITE cycle to properly compute and store the RAID-5 parity information.

Figure 3:
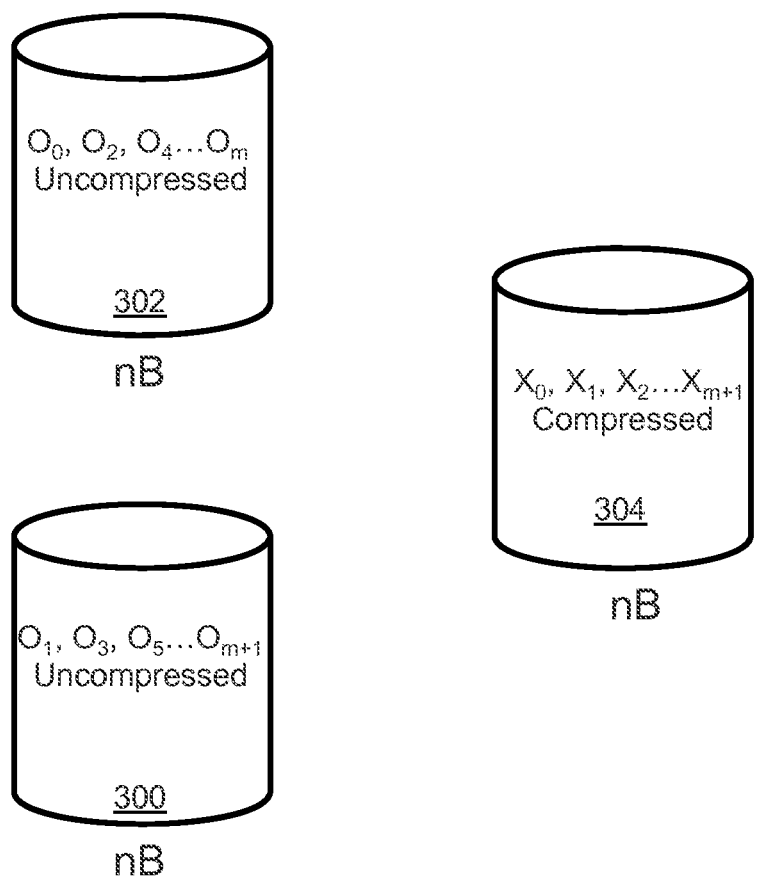
FIG. 3 illustrates an alternative half-compressed RAID 1 in which multiple devices with uncompressed data are associated with a device with compressed data.

FIG. 3 illustrates an alternative half-compressed RAID 1 in which multiple logical volumes and their associated storage devices 300, 302 with uncompressed data are associated with a single logical volume and its at least one associated storage device 304 with compressed data. The uncompressed volumes are similar to the uncompressed volume depicted in FIG. 2. However, the compressed volume is a mirror for both uncompressed volumes. This variation more efficiently utilizes an array of storage devices of similar capacity in a half-compressed RAID 1 implementation, i.e., relative to leaving unutilized capacity on the compressed volume. For example, two storage devices of nB capacity with uncompressed data can be mirrored by one storage device of nB capacity with compressed data, assuming the data compresses at 50%.

Figure 4:
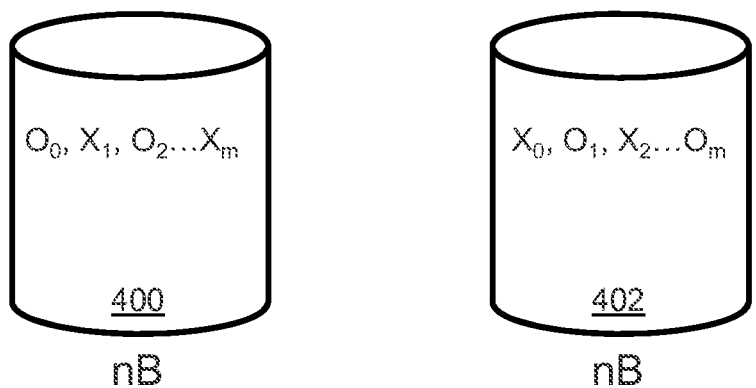
FIG. 4 illustrates an alternative half-compressed RAID 1 in which compression striping is implemented.

FIG. 4 illustrates an alternative half-compressed RAID 1 in which compression striping is implemented. Compression striping distributes the compressed and uncompressed data across two or more logical volumes or storage devices 400, 402. For example, for a section (extent) of storage or sub-extent such as block 0 an uncompressed copy $O_0$ is maintained on a first storage device 400 and a compressed copy $X_0$ is maintained on a second storage device 402, while for an adjacent extent or sub-extent such as block 1 an uncompressed copy $O_1$ is maintained on the second storage device and a compressed copy $X_1$ is maintained on the first storage device. As a result, alternating extents or sub-extents of compressed and uncompressed data are maintained on each device, although other striping patterns could be utilized. This variation reduces data access response time because uncompressed data can be read or written using both volumes or storage devices, but also realizes the benefits associated with the embodiments described above.

Figure 5:
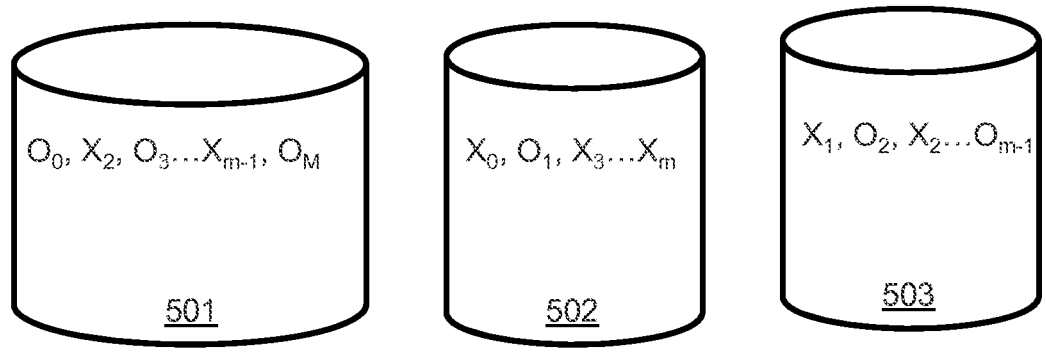
FIG. 5 illustrates alternative embodiment of compression striping.

Referring to FIG. 5, alternative striping variations are possible. For example, an n-way stripe can be maintained. In the illustrated example, for a section (extent) of storage or sub-extent such as block 0, an uncompressed copy $O_0$ is stored on first storage device 501, and compressed copy $X_0$ is stored on second storage device 502. For block 1, an uncompressed copy $O_1$ is stored on second storage device 502, and compressed copy $X_1$ is stored on third storage device 502. For block 2, an uncompressed copy $O_2$ is stored on third storage device 503, and compressed copy $X_3$ is stored on first storage device 503.

Figure 6:
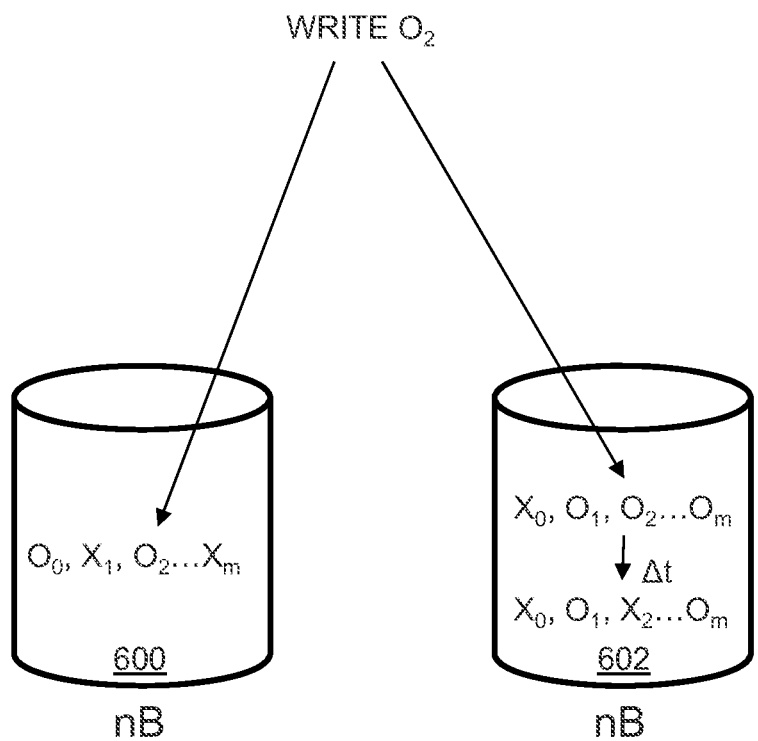
FIG. 6 illustrates delayed compression.

FIG. 6 illustrates a delayed compression feature which can be utilized with any of the previously described embodiments. When a WRITE operation occurs two copies of a block $O_2$ are written, a first copy on a first volume or storage device 600 and a second copy on a second volume or storage device 602. At a later time when some condition is met, one of the copies is compressed. The copy to be compressed to form block $X_2$ may be selected to achieve a particular result such as compression striping or any of the other embodiments described above. The condition for initiating compression can be availability of CPU cycles, frequency of WRITE ops to that extent over a predefined period of time, time since a most recent WRITE to that extent, frequency of READ ops to that extent over a predefined period of time, time since a most recent READ to that extent, some other consideration indicating that the data is either quiescent or only being read or some combination of these conditions.

One advantage of delayed compression is that time to perform WRITES is improved, e.g., comparable to RAID1 because real-time compression is not necessary.

Figure 7:
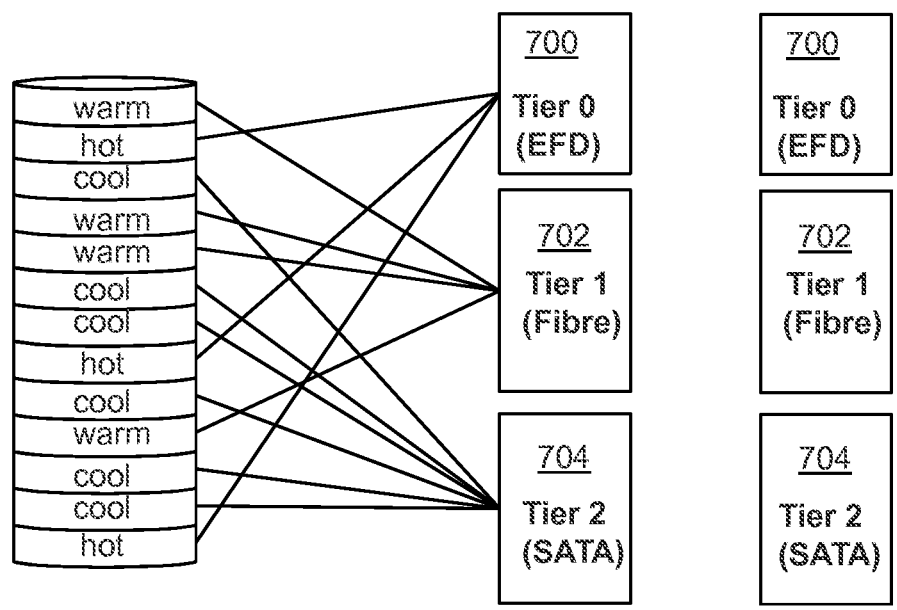
FIG. 7 illustrates tier based compression.

FIG. 7 illustrates tier based compression. Data at the extent or sub-extent level is stored in a tier which is selected on grounds such as relative ranking based on expected activity level (e.g., cool, warm, hot) of the data. The illustrated logical volume includes corresponding mirrored physical devices such as high-speed flash (EFD) arrays (700) at tier 0, Fibre Channel arrays (702) at tier 1, and SATA arrays (704) at tier 2. Tier 0 is used to store extents or sub-extents which are expected to be the most frequently used (hot). In particular, the highest ranked extents or sub-extents of storage in terms of expected use up to the capacity of tier 0 are selected for storage at tier 0. Extents or sub-extents of storage which are expected to be less frequently used than hot extents or sub-extents (warm) are stored at tier 1. In particular, the next highest group ranked extents or sub-extents in terms of expected use up to the capacity of tier 1 are selected for storage at tier 1. The remaining extents or sub-extents are stored at tier 2. Expected activity level tends to change over time so data is moved between slower storage devices and faster storage devices based on updates to expected activity. For example, extents or sub-extents which are expected to be frequently accessed are stored on relatively faster devices, but may be moved to relatively slower devices when the extents or sub-extents are not expected to be accessed for a predetermined period of time. In accordance with an embodiment of the invention compression of one copy of an extent or sub-extent of data in accordance with half-compressed RAID 1 may be based on whether cost of storage or cost of compression is greater. For example, compression might only be performed in tiers above or below a predetermined level where storage at a particular level such as Tier 2 is so inexpensive that the cost of compression/decompression is greater. In one embodiment compression is only performed when the extent or sub-extent of data has not had an IO for a predetermined period of time and is still eligible for a high tier such as Tier 0 or Tier 1 as determined by a threshold. In another embodiment compression is only performed when the extent or sub-extent of data is being demoted to a lower tier.

A variation on the tier based compression described above is to store the copies on different tiers. For example, one copy of a RAID 1 half compressed data group could be stored at Tier 1 while the other copy is stored on Tier 2. It should be noted however that none of the embodiments are limited to any particular storage media, and cache, RAM and other types of memory and storage could be utilized.

The determination of whether to store a compressed or uncompressed version of the data can be decided independently for each tier and each data extent or sub-extent based on the cost and availability of storage on that tier when compared with the cost and availability of CPU cycles to compress the WRITEs and uncompress future expected READs; as well as the expected future READ and WRITE access for the data from this tier. This decision can be static, i.e. decided on a fixed basis that is change relatively infrequently; or dynamic, i.e. decided at a more frequent interval or real-time. For example, the system may determine that data that is rarely accessed but which needs quick availability for those relatively rare situations when it is required would be stored compressed on both a fast storage tier and a slow storage tier. Examples of such data is data that is needed when a client machine boots up, or data that is needed for a few minutes at the beginning of every business day.

The system may choose to change the compression of one or the other of the copies at a later time based on changes in the availability of compute and storage resources or changes in the anticipated READ and WRITE access patterns for the data.

The system may choose to not compress while there is plenty of unused space on the storage medium and then compress one or both of the copies when there is less storage space available. Conversely, the system may choose to uncompress data when additional storage space becomes available for the desired storage medium.

When the storage system needs to move data internally, the storage system can move the data uncompressed. This is especially true if the source copy is compressed and the target copy is intended to be compressed. Since the content of the data is not being interpreted by the storage system, the storage system can potentially move the data more efficiently by keeping the data compressed during the move without uncompressing the data. Similarly, a plurality of storage systems that work together in a federated way can transfer compressed copies of the data between them without an intermediate uncompressed copy being made. For example, the storage systems in such a federation may be working with each other to achieve data replication for increased availability, increased performance, load-balancing, backup, migration or other purposes.

Figure 8:
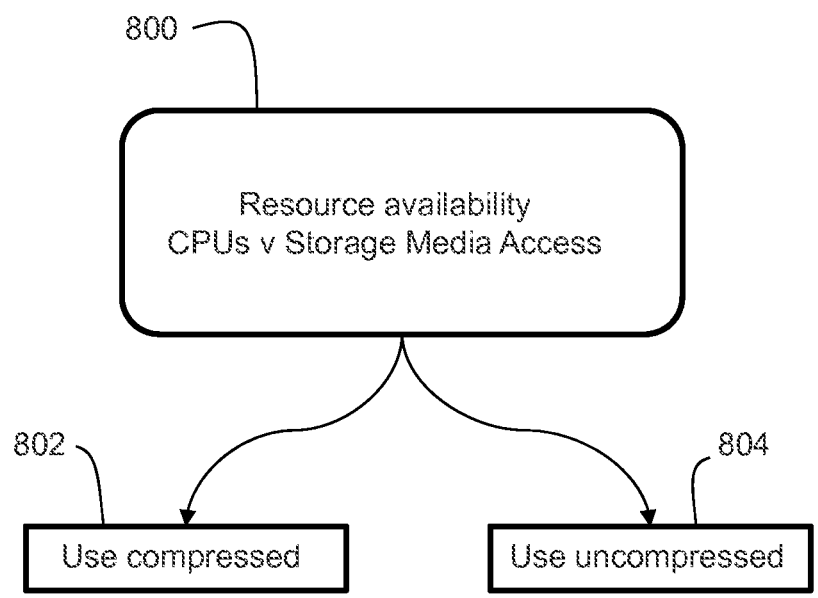
FIG. 8 illustrates data access based on resource availability.

FIG. 8 illustrates data access based on resource availability with half-compressed RAID 1. One bottleneck for data access is CPU cycles, because compression/decompression resources such as CPUs are required to either compress or decompress data. Another bottleneck is storage media access because storage media cannot simultaneously service an unlimited number of READs and WRITEs. In accordance with an embodiment of the invention when a READ operation occurs the system compares resource availability, e.g., CPUs versus storage media access, as shown in step 800. The copy of the data used to perform the READ is selected based on the outcome of that comparison. In particular, if CPUs are relatively more available then the compressed copy of the data is used to perform the READ operation as shown in step 802. Alternatively, if storage media access is relatively more available then the uncompressed copy of the data is used to perform the READ operation as shown in step 804. One benefit of this approach is that it tends to balance the load on CPUs and media access while improving READ response time.

A variation on this scheme is to have more than one compression algorithm available. Compression algorithms often have different tradeoffs between cpu-usage and compression ratios. The system could choose between no-compression or using a particular compression scheme based on the criteria given above.

The techniques described above are not limited to use with RAID and can be implemented without complying with a RAID level or used in general for replicated storage systems including but not limited to Hadoop and similar file systems. In systems where data has n replicas, some subset of those replicas could be compressed, e.g., depending on whether the scheduler/resource manager determines that storage or compute is the rarer commodity at a particular node, and how often a particular copy of the data is predicted to be decompressed.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus comprising:
  a storage platform that provides access to data of a data set in response to READ operations, the storage platform comprising:
    compute resources comprising a plurality of CPUs; and
    storage resources comprising a plurality of physical storage devices on which the data set is stored;
  wherein the storage platform creates and is configured to maintain the data set on at least one improved RAID protection group characterized by first and second mirrored volumes associated respectively with first and second different sets of the physical data storage devices upon which are stored first and second copies of the data set, the data set comprising all data stored by the first and second volumes, wherein the compute nodes cause the first copy of the data set to be maintained in an uncompressed state and the second copy of the data set to be maintained in a compressed state, and wherein for a condition in which both storage media access and decompression resources are available to service a READ operation associated with a member of the data set the compute resources compare availability of the storage media access with availability of the decompression resources and use the compressed copy of the data set to perform the READ operation responsive to the decompression resources being more available than the storage media access, and the compute resources use the uncompressed copy to perform the READ operation responsive to the storage media access being more available than the decompression resources, whereby the storage platform provides RAID-1 comparable reliability and performance without incurring RAID-1 storage capacity requirements.

2. The apparatus of claim 1 wherein in response to a WRITE operation associated with a member of the data set, the compute resources cause the member of the data set to be stored uncompressed on the first set of physical data storage devices and stored uncompressed on the second set of physical data storage devices until a predetermined condition is met, in response to which the compute resources cause the member of the data set to be stored compressed on the second set of physical data storage devices while remaining uncompressed on the first set of physical data storage devices.

3. The apparatus of claim 2 wherein the predetermined condition includes at least one of: availability of CPU cycles, frequency of WRITE ops to an extent associated with the member of the data set over a predefined period of time, time since a most recent WRITE to that extent, frequency of READ ops to an extent associated with the member of the data set over a predefined period of time, time since a most recent READ to that extent, and an indication that an extent associated with the member of the data set is either quiescent or only being read.

4. The apparatus of claim 1 comprising a plurality of hierarchical tiers of data storage devices, and wherein compression is utilized at only a subset of the tiers.

5. The apparatus of claim 1 wherein the first copy is associated with a first hierarchical tier and the second copy is associated with a second hierarchical tier.

6. The apparatus of claim 1 wherein the two copies of the data set are presented as RAID 1 protected storage.

7. The apparatus of claim 1 wherein compressed copies are striped across more than two data storage devices.

8. The apparatus of claim 1 wherein at least one of the physical data storage devices is associated with a tier of a plurality of hierarchical tiers, and further comprising logic which determines whether to store a compressed or uncompressed copy independently for each tier and for a data extent or a sub-extent based on cost and availability of storage on that tier when compared with the cost and availability of CPU cycles to compress WRITEs and uncompress future expected READs, and expected future READ and WRITE access for the data from the tier.

9. The apparatus of claim 8 wherein parameters for the determination are dynamically updated.

10. The apparatus of claim 1 wherein storage resources are available and compression state is changed based on changes in availability of compute and storage resources or changes in anticipated READ and WRITE access patterns for the data.

11. The apparatus of claim 1 wherein compression state is changed based on need to move data.

12. The apparatus of claim 1 wherein a compression algorithm is selected based on CPU usage and compression ratios.

13. A method comprising:
using a storage platform that provides access to data of a data set in response to READ operations, the storage platform comprising compute resources comprising a plurality of CPUs and storage resources comprising a plurality of physical storage devices on which the data set is stored:
creating at least one RAID protection group using first and second mirrored volumes associated respectively with first and second different sets of the physical data storage devices;
storing first and second copies of the data set, the data set comprising all data stored by the first and second volumes, wherein storing comprises maintaining the first copy of the data set in an uncompressed state and maintaining the second copy of the data set in a compressed state; and
for a condition in which both storage media access and decompression resources are available to service a READ operation associated with a member of the data set:
comparing availability of the storage media access with availability of the decompression resources;
using the compressed copy of the data set to perform the READ operation responsive to the decompression resources being more available than the storage media access; and
using the uncompressed copy to perform the READ operation responsive to the storage media access being more available than the decompression resources,
whereby the storage platform provides RAID-1 comparable reliability and performance without incurring RAID-1 storage capacity requirements.

14. The method of claim 13 comprising, in response to a WRITE operation associated with a member of the data set, storing the member of the data set uncompressed on the first set of physical data storage devices and storing the member of the data set uncompressed on the second set of physical data storage devices until a predetermined condition is met, and compressing the member of the data set when the condition is met and storing the member of the data set compressed on the second set of physical data storage devices while a copy remains uncompressed on the first set of physical data storage devices.

15. The method of claim 14 comprising performing calculations to determine whether the predetermined condition is met based on at least one of: availability of CPU cycles, frequency of WRITE ops to an extent associated with the member of the data set over a predefined period of time, time since a most recent WRITE to that extent, frequency of READ ops to an extent associated with the member of the data set over a predefined period of time, time since a most recent READ to that extent, and an indication that an extent associated with the member of the data set is either quiescent or only being read.

16. The method of claim 13 wherein a plurality of hierarchical tiers of data storage devices are available, and comprising utilizing compression at only a subset of the tiers.

17. The method of claim 13 comprising maintaining the first copy of the data set in an uncompressed state in a first hierarchical tier of storage and maintaining the second copy of the data set in a compressed state in a second hierarchical tier of storage.

18. The method of claim 13 comprising presenting the two copies of the data set as RAID 1 protected storage.

19. The method of claim 13 comprising striping compressed copies across more than two data storage devices.

20. The method of claim 13 wherein at least one of the physical data storage devices is associated with a tier of a plurality of hierarchical tiers, and comprising determining whether to store a compressed or uncompressed copy independently for each tier and-for a data extent or a sub-extent based on cost and availability of storage on that tier when compared with the cost and availability of CPU cycles to compress WRITEs and uncompress future expected READs, and expected future READ and WRITE access for the data from the tier.

21. The method of claim 20 comprising dynamically updating parameters for determining whether to store the compressed or uncompressed copy.

22. The method of claim 13 wherein storage resources are available and comprising changing compression state based on changes in availability of compute and storage resources or changes in anticipated READ and WRITE access patterns for the data.

23. The method of claim 13 comprising changing compression state based on need to move data.

24. The method of claim 13 comprising selecting a compression algorithm based on CPU usage and compression ratios.

25. A non-transitory computer readable medium storing instructions that when executed by a storage platform computer cause the storage platform computer to perform a method for using the storage platform for providing access to data of a data set in response to READ operations, the method comprising:
creating at least one RAID protection group by storing, on first and second mirrored volumes associated respectively with first and second different sets of physical data storage devices, first and second copies of a data set comprising all data stored by the first and second volumes;

maintaining the first copy of the data set in an uncompressed state and maintaining the second copy of the data set in a compressed state; and for a condition in which both storage media access and decompression resources are available to service a READ operation associated with a member of the data set:

comparing availability of the storage media access with availability of the decompression resources;

using the compressed copy of the data set to perform the READ operation responsive to the decompression resources being more available than the storage media access; and using the uncompressed copy to perform the READ operation responsive to the storage media access being more available than the decompression resources, whereby the storage platform provides RAID-1 comparable reliability and performance without incurring RAID-1 storage capacity requirements.

26. The non-transitory computer readable medium of claim 25 wherein the method further comprises storing, in response to a WRITE operation associated with a member of the data set, the member of the data set uncompressed on the first set of physical data storage devices and storing the member of the data set uncompressed on the second set of physical data storage devices until a predetermined condition is met, and compressing the member of the data set when the condition is met and storing the member of the data set compressed on the second set of physical data storage devices while a copy remains uncompressed on the first set of physical data storage devices.

27. The non-transitory computer readable medium of claim 26 wherein the method further comprises performing calculations to determine whether the predetermined condition is met based on at least one of: availability of CPU cycles, frequency of WRITE ops to an extent associated with the member of the data set over a predefined period of time, time since a most recent WRITE to that extent, frequency of READ ops to an extent associated with the member of the data set over a predefined period of time, time since a most recent READ to that extent, and an indication that an extent associated with the member of the data set is either quiescent or only being read.

28. The non-transitory computer readable medium of claim 25 wherein a plurality of hierarchical tiers of data storage devices are available and wherein the method further comprises utilizing compression at only a subset of the tiers.

29. The non-transitory computer readable medium of claim 25 wherein the method further comprises maintaining the first copy of the data set in an uncompressed state in a first hierarchical tier of storage and maintaining the second copy of the data set in a compressed state in a second hierarchical tier of storage.

30. The non-transitory computer readable medium of claim 25 wherein storage media access is available and wherein the method further comprises, for a READ operation request associated with a member of the data set, using the compressed copy to perform the READ operation if decompression resources are more available than storage media access, and using the uncompressed copy to perform the READ operation if storage media access is more available than decompression resources.

31. The non-transitory computer readable medium of claim 25 wherein the method further comprises presenting the two copies of the data set as RAID 1 protected storage.

32. The non-transitory computer readable medium of claim 25 wherein the method further comprises striping compressed copies across more than two data storage devices.

33. The non-transitory computer readable medium of claim 25 wherein at least one of the physical data storage devices is associated with a tier of a plurality of hierarchical tiers, and wherein the method further comprises determining whether to store a compressed or uncompressed copy independently for each tier and a data extent or a sub-extent based on cost and availability of storage on that tier when compared with the cost and availability of CPU cycles to compress WRITEs and uncompress future expected READs, and expected future READ and WRITE access for the data from the tier.

34. The non-transitory computer readable medium of claim 33 wherein the method further comprises dynamically updating parameters for determining whether to store the compressed or uncompressed copy.

35. The non-transitory computer readable medium of claim 25 wherein storage resources are available and wherein the method further comprises changing compression state based on changes in availability of compute and storage resources or changes in anticipated READ and WRITE access patterns for the data.

36. The non-transitory computer readable medium of claim 25 wherein the method further comprises changing compression state based on need to move data.

37. The non-transitory computer readable medium of claim 25 wherein the method further comprises selecting a compression algorithm based on CPU usage and compression ratios.

* * * * *